US012607163B2

(12) United States Patent
Angel et al.

(10) Patent No.: US 12,607,163 B2
(45) Date of Patent: Apr. 21, 2026

(54) SYSTEM AND METHOD FOR DETECTING AND RESPONDING TO ROTOR BLADE DAMAGE IN A WIND TURBINE

(71) Applicant: General Electric Renovables Espana, S.L., Barcelona (ES)

(72) Inventors: Mathew Doyle Angel, Greenville, SC (US); Aaron David Honnette, Greenville, SC (US); Carlos Alberto Concha Flores, Greer, SC (US); Jonathan Henry Zalar, Greer, SC (US); Mohammed Yousefhussien, London (CA); Aaron Yarbrough, Greenville, SC (US)

(73) Assignee: GE Vernova Renovables Espana, S.L.U., Barcelona (ES)

( * ) Notice: Subject to any disclaimer, the term of this patent is extended or adjusted under 35 U.S.C. 154(b) by 501 days.

(21) Appl. No.: 17/900,284

(22) Filed: Aug. 31, 2022

(65) Prior Publication Data

US 2024/0068442 A1 Feb. 29, 2024

(51) Int. Cl.
*F03D 7/02* (2006.01)

(52) U.S. Cl.
CPC ........ *F03D 7/0264* (2013.01); *F05B 2260/80* (2013.01); *F05B 2270/104* (2013.01); *F05B 2270/107* (2013.01); *F05B 2270/301* (2013.01); *F05B 2270/328* (2013.01); *F05B 2270/337* (2013.01)

(58) Field of Classification Search
None
See application file for complete search history.

(56) References Cited

U.S. PATENT DOCUMENTS

| | | | |
|---|---|---|---|
| 4,237,454 | A | 12/1980 | Meyer |
| 5,955,880 | A | 9/1999 | Beam et al. |
| 7,086,834 | B2 | 8/2006 | LeMieux |

(Continued)

FOREIGN PATENT DOCUMENTS

| | | |
|---|---|---|
| CN | 202547923 U | 11/2012 |
| CN | 104515677 A | 4/2015 |

(Continued)

OTHER PUBLICATIONS

European Search Report Corresponding to EP23193983 on Jan. 22, 2024.

(Continued)

*Primary Examiner* — Howard Cortes
(74) *Attorney, Agent, or Firm* — Dority & Manning, P.A.

(57) ABSTRACT

A method for detecting and responding to damage in a rotor blade of a wind turbine includes monitoring at least one signal of a pitch actuator of a pitch system of the rotor blade of the wind turbine. The signal(s) is a proxy for a pitch driving torque of the pitch actuator of the pitch system. Thus, the method includes defining a metric that captures certain behavior of the proxy for the pitch driving torque of the pitch actuator of the pitch system. The method further includes comparing the metric to a corresponding metric associated with a reference rotor blade representing a healthy rotor blade. Moreover, the method includes implementing a control action when the metric is outside of a predetermined range defined by the healthy rotor blade.

19 Claims, 10 Drawing Sheets

200

(56) References Cited

U.S. PATENT DOCUMENTS

| | | | |
|---|---|---|---|
| 7,954,372 B2 | 6/2011 | Brath et al. | |
| 8,043,048 B2 | 10/2011 | Daniels et al. | |
| 8,434,360 B2 | 5/2013 | Cheng | |
| 8,511,177 B1 | 8/2013 | Makaremi | |
| 8,546,967 B2 | 10/2013 | Ormel et al. | |
| 8,994,359 B2 | 3/2015 | Neti et al. | |
| 9,032,807 B2 | 5/2015 | Olesen | |
| 9,086,048 B2 | 7/2015 | Roesmann et al. | |
| 9,523,354 B2 | 12/2016 | Olesen | |
| 10,371,123 B2 | 8/2019 | Kammer | |
| 11,002,250 B2 | 5/2021 | Grunnet et al. | |
| 2005/0276696 A1 | 12/2005 | LeMieux | |
| 2007/0041834 A1 | 2/2007 | Schram et al. | |
| 2008/0206052 A1 | 8/2008 | Volkmer | |
| 2009/0116962 A1 | 5/2009 | Pedersen et al. | |
| 2009/0243295 A1* | 10/2009 | Kammer | F03D 7/043 |
| | | | 290/44 |
| 2009/0262331 A1 | 10/2009 | Burchardt et al. | |
| 2010/0119370 A1 | 5/2010 | Myhr | |
| 2010/0219987 A1 | 9/2010 | Isom et al. | |
| 2011/0018727 A1 | 1/2011 | Bharadwaj et al. | |
| 2011/0020122 A1 | 1/2011 | Parthasarathy et al. | |
| 2011/0142594 A1* | 6/2011 | Dinjus | F03D 17/00 |
| | | | 416/26 |
| 2011/0158805 A1 | 6/2011 | Miranda et al. | |
| 2011/0224917 A1 | 9/2011 | Uluyol et al. | |
| 2012/0053851 A1* | 3/2012 | Baller | F03D 1/0658 |
| | | | 416/61 |
| 2012/0253697 A1 | 10/2012 | Frankenstein et al. | |
| 2013/0049733 A1 | 2/2013 | Neti et al. | |
| 2013/0338938 A1 | 12/2013 | Coultate | |
| 2014/0151578 A1 | 6/2014 | Glavind et al. | |
| 2014/0172326 A1 | 6/2014 | Zhang et al. | |
| 2014/0260634 A1 | 9/2014 | Newman | |
| 2015/0000404 A1 | 1/2015 | Brenner et al. | |
| 2015/0050143 A1 | 2/2015 | Kammer | |
| 2015/0345467 A1 | 12/2015 | Kramer | |
| 2015/0354402 A1 | 12/2015 | Ehsani et al. | |
| 2015/0369698 A1 | 12/2015 | Sakaguchi et al. | |
| 2016/0285252 A1* | 9/2016 | Burra | H02J 3/381 |
| 2017/0107973 A1* | 4/2017 | Drossel | F03D 1/06 |
| 2017/0328349 A1 | 11/2017 | Pan et al. | |
| 2018/0142674 A1* | 5/2018 | Hammerum | F03D 7/045 |
| 2018/0230971 A1 | 8/2018 | Ikawa et al. | |
| 2018/0372075 A1 | 12/2018 | Muller et al. | |
| 2019/0033889 A1* | 1/2019 | von Flotow | B64U 70/30 |
| 2019/0048849 A1 | 2/2019 | Grunnet et al. | |
| 2019/0063404 A1* | 2/2019 | Baba | F03D 7/024 |
| 2019/0219032 A1 | 7/2019 | He et al. | |
| 2020/0232446 A1* | 7/2020 | Hawkins | F03D 80/70 |
| 2020/0340447 A1* | 10/2020 | Jiang | F03D 7/0224 |
| 2021/0102527 A1* | 4/2021 | Liu | G05B 23/0254 |
| 2023/0011028 A1 | 1/2023 | He et al. | |
| 2023/0129895 A1 | 4/2023 | Hansen | |

FOREIGN PATENT DOCUMENTS

| | | | |
|---|---|---|---|
| CN | 105756864 A | 7/2016 | |
| CN | 102889175 B | 11/2016 | |
| CN | 107448362 A | 12/2017 | |
| DE | 10065314 A1 | 7/2002 | |
| DE | 102008046357 A1 | 3/2010 | |
| DE | 102016210755 A1 | 12/2017 | |
| EP | 2105609 A2 | 9/2009 | |
| EP | 2626683 B1 | 7/2014 | |
| EP | 3919740 A1 | 12/2021 | |
| WO | WO2009059606 A2 | 5/2009 | |
| WO | WO2012066107 A9 | 7/2012 | |
| WO | WO2017137050 A1 | 8/2017 | |
| WO | WO2021/126162 A1 | 6/2021 | |
| WO | WO2021/219175 A1 | 11/2021 | |

OTHER PUBLICATIONS

He et al., Remote Monitoring and Diagnostics of Blade Health in Commercial MW-Scale Wind Turbines Using Electrical Signature Analysis (ESA), XP033850961, 2020 IEEE Energy Conversion Congress and Exposition, 2020, 808-813.

U.S. Appl. No. 17/783,356, filed Jun. 8, 2022.

Gong et al., "Bearing Fault Detection for Direct-Drive Wind Turbines via Stator Current Spectrum Analysis", Energy Conversion Congress and Exposition (ECCE), Sep. 17-22, 2011, pp. 313-318.

Jeffries et al., Experience with Bicoherence of Electrical Power for Condition Monitoring of Wind Turbine Blades, IEE Proceedings—Vision, Image and Signal Processing, vol. 145, Issue 3, 1998, pp. 141-148. https://www.researchgate.net/publication/3359021_Experience_with_bicoherence_of_electrical_power_for_condition_monitoring_of_wind_turbine_blades.

Kandukuri et al., Fault Diagnostics for Electrically Operated Pitch Systems in Offshore Wind Turbines, Journal of Physics, vol. 753, 2016, 14 Pages.

Lu et al., A Review of Recent Advances in Wind Turbine Condition Monitoring and Fault Diagnosis, Power Electronics and Machines in Wind Applications, Jun. 24-26, 2009. (Abstract Only).

Nielsen et al., "Analysis of pitch system data for condition monitoring", Wind Energy, vol. 17, Issue: 3, Mar. 2014, pp. 435-449.

Rezamand et al., A New Hybrid Fault Detection Method for Wind Turbine Blades Using Recursive PCA and Wavelet-based PDF, IEEE Sensors Journal, vol. 20, Issue 4, 2019, pp. 2023-2033. https://ieeexplore.ieee.org/document/8879580.

Yang et al., Wind Turbine Condition Monitoring and Fault Diagnosis Using Both Mechanical and Electrical Signatures, IEEE/ASME International Conference on Advanced Intelligent Mechatronics, Jul. 2-5, 2008. (Abstract Only).

* cited by examiner

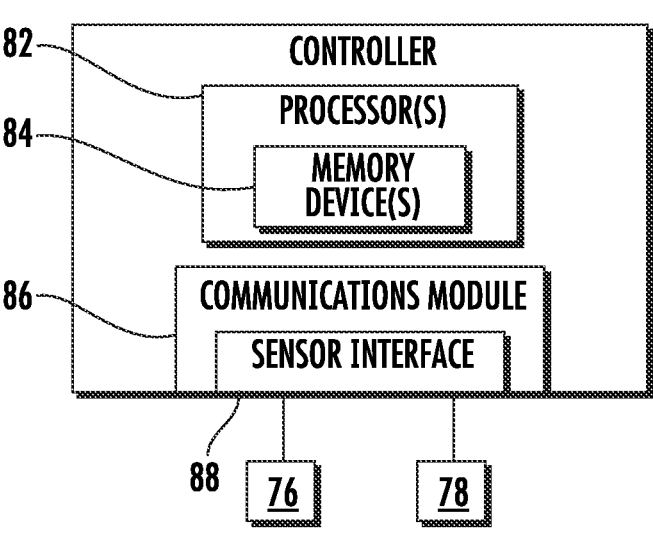
FIG. 5

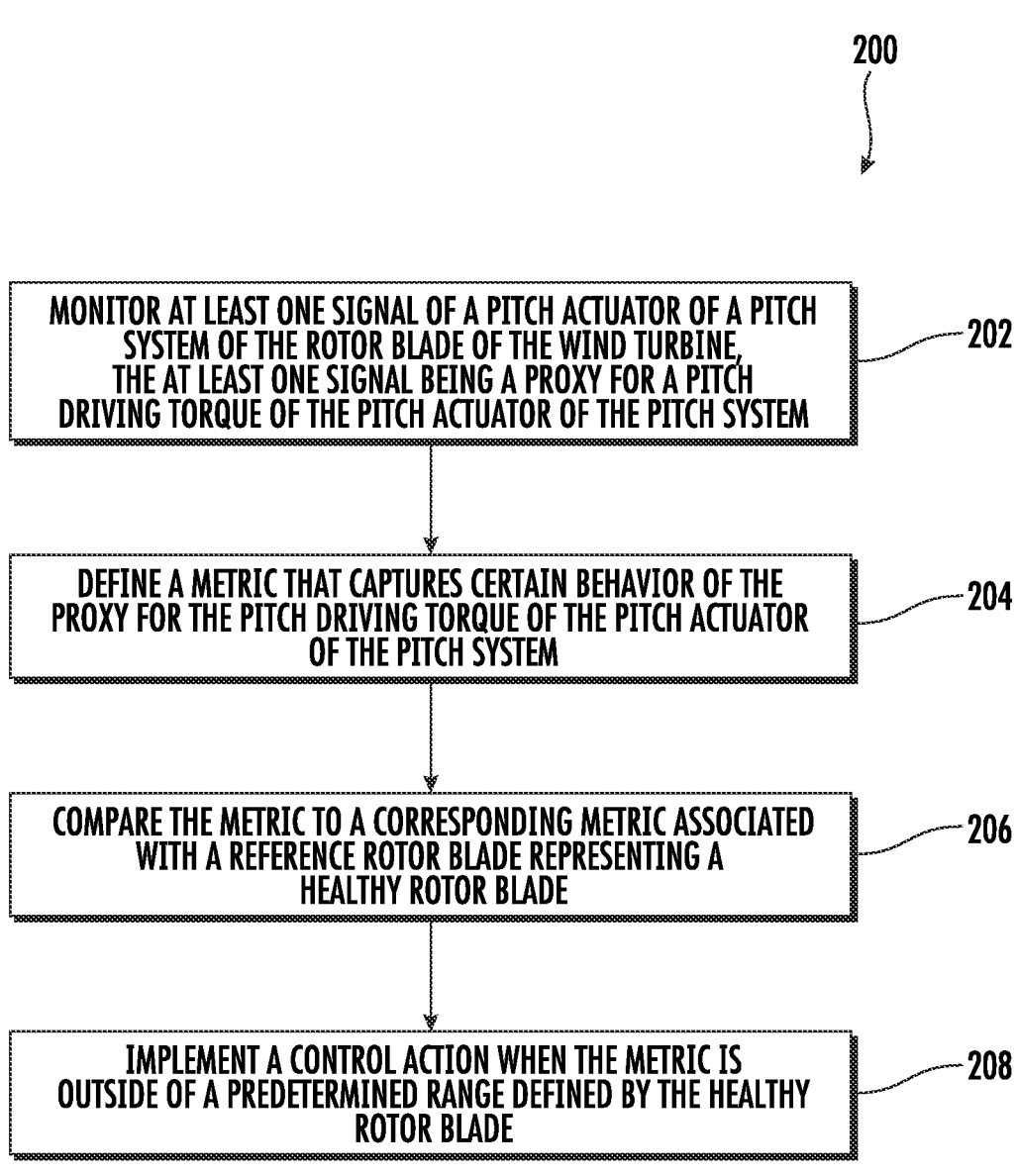

200

MONITOR AT LEAST ONE SIGNAL OF A PITCH ACTUATOR OF A PITCH
SYSTEM OF THE ROTOR BLADE OF THE WIND TURBINE,
THE AT LEAST ONE SIGNAL BEING A PROXY FOR A PITCH
DRIVING TORQUE OF THE PITCH ACTUATOR OF THE PITCH SYSTEM          202

DEFINE A METRIC THAT CAPTURES CERTAIN BEHAVIOR OF THE
PROXY FOR THE PITCH DRIVING TORQUE OF THE PITCH ACTUATOR
OF THE PITCH SYSTEM          204

COMPARE THE METRIC TO A CORRESPONDING METRIC ASSOCIATED
WITH A REFERENCE ROTOR BLADE REPRESENTING A
HEALTHY ROTOR BLADE          206

IMPLEMENT A CONTROL ACTION WHEN THE METRIC IS
OUTSIDE OF A PREDETERMINED RANGE DEFINED BY THE HEALTHY
ROTOR BLADE          208

AVG MOTOR CURRENT 1
AVG MOTOR CURRENT 2
AVG MOTOR CURRENT 3

GENERAL PROCESSING

SLOPE 1, AVG
SLOPE 2, AVG
SLOPE 3, AVG

300

302

AVG RMS MOTOR CURRENT 1
AVG RMS MOTOR CURRENT 2
AVG RMS MOTOR CURRENT 3

GENERAL PROCESSING

SLOPE 1, RMS AVG
SLOPE 2, RMS AVG
SLOPE 3, RMS AVG

300

302

304  DISCARD IMPLAUSIBLE DATA AND LOW THRUST WINDOWS

AXIS 1 SIGNAL
AXIS 2 SIGNAL
AXIS 3 SIGNAL

306  GENERAL PROCESSING

308  CENTER AROUND MEDIAN PITCH AXIS

310

312  CALCULATE SLOPE WITH RESPECT TO TIME

314

316  CENTER AROUND MEDIAN PITCH AXIS

318

SLOPE 1
SLOPE 2
SLOPE 3

320  SLOPE AXIS X, AVG  ABS

320  SLOPE AXIS X, AVG RMS  ABS

322  MAX

324

326  >0.004

FLAG AXIS X

FLAGGING CRITERIA

SLOPE = dY/dX

318

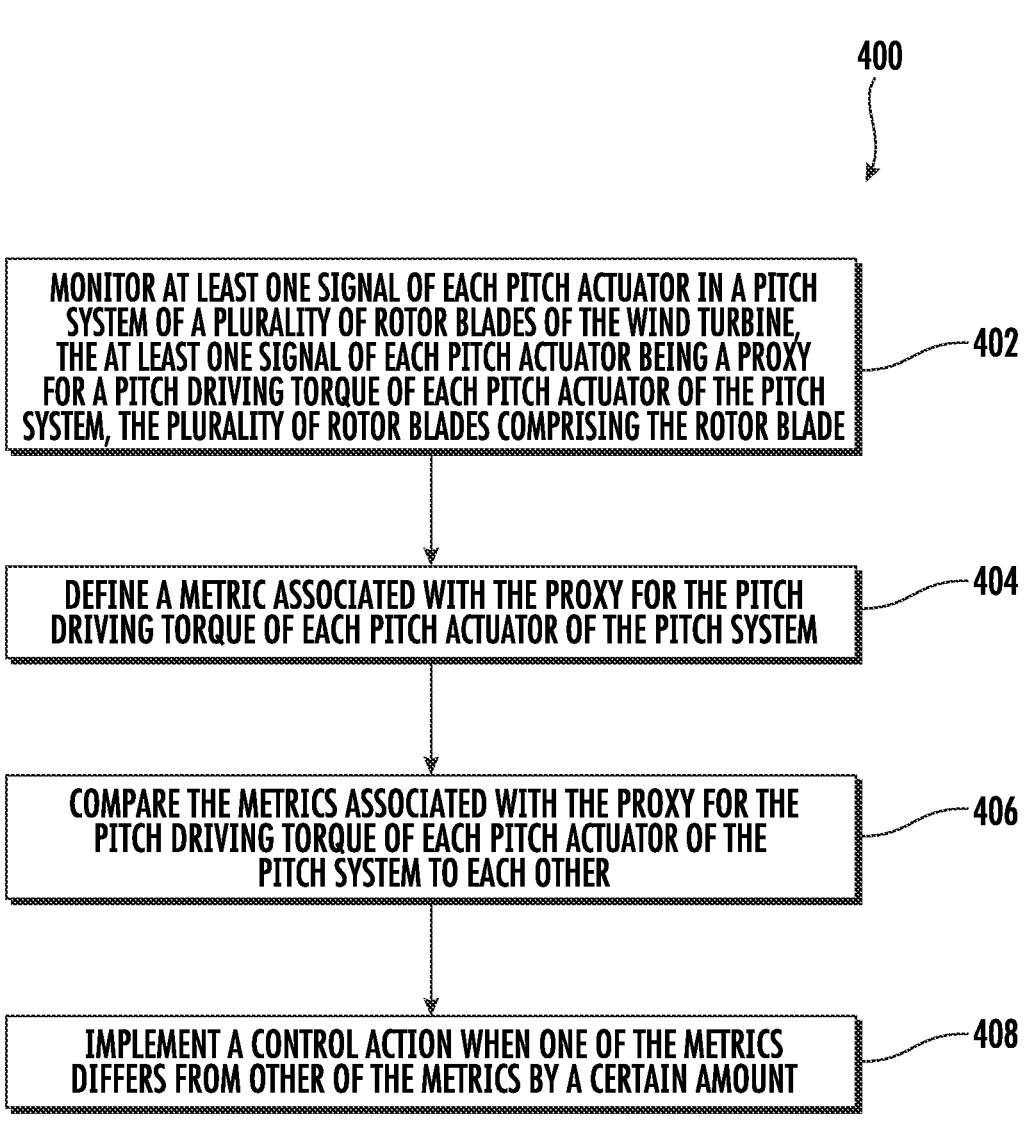

400

MONITOR AT LEAST ONE SIGNAL OF EACH PITCH ACTUATOR IN A PITCH SYSTEM OF A PLURALITY OF ROTOR BLADES OF THE WIND TURBINE, THE AT LEAST ONE SIGNAL OF EACH PITCH ACTUATOR BEING A PROXY FOR A PITCH DRIVING TORQUE OF EACH PITCH ACTUATOR OF THE PITCH SYSTEM, THE PLURALITY OF ROTOR BLADES COMPRISING THE ROTOR BLADE ~402

DEFINE A METRIC ASSOCIATED WITH THE PROXY FOR THE PITCH DRIVING TORQUE OF EACH PITCH ACTUATOR OF THE PITCH SYSTEM ~404

COMPARE THE METRICS ASSOCIATED WITH THE PROXY FOR THE PITCH DRIVING TORQUE OF EACH PITCH ACTUATOR OF THE PITCH SYSTEM TO EACH OTHER ~406

IMPLEMENT A CONTROL ACTION WHEN ONE OF THE METRICS DIFFERS FROM OTHER OF THE METRICS BY A CERTAIN AMOUNT ~408

SYSTEM AND METHOD FOR DETECTING AND RESPONDING TO ROTOR BLADE DAMAGE IN A WIND TURBINE

FIELD

The present disclosure relates generally to wind turbines, and more particularly, to systems and methods for detecting and responding to rotor blade damage in a wind turbine.

BACKGROUND

Wind power is considered one of the cleanest, most environmentally friendly energy sources presently available, and wind turbines have gained increased attention in this regard. A modern wind turbine typically includes a tower, a generator, an optional gearbox, a nacelle, and one or more rotor blades. The rotor blades capture kinetic energy from wind using known airfoil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

During operation of the wind turbine, the components thereof are subjected to various loads. If the loads exceed design thresholds, the components are at risk for damage and/or failure. Rotor blade damage and/or failure is a common occurrence in wind turbines, is very costly, and can lead to substantial downtime. In addition, rotor blade damage and/or failure can also result in tower damage or destruction, leading to even more costs and downtime.

Currently-used technologies focus on blade inspection, such as image capturing and drone inspection to detect blade damage. Such methods, however, cannot be used to detect hidden blade cracks. Still other methods for detecting blade damage may include fiber optic sensing or paired antennas, but such systems are very costly.

Accordingly, improved systems and methods for detecting and responding to rotor blade damage in a wind turbine would be welcomed in the art so as to provide an early warning about the blade condition. Thus, the repair and maintenance process could be largely improved and the downtime and related losses can be minimized.

BRIEF DESCRIPTION

Aspects and advantages of the invention will be set forth in part in the following description, or may be obvious from the description, or may be learned through practice of the invention.

In an aspect, the present disclosure is directed to a method for detecting and responding to damage in a rotor blade of a wind turbine. The method includes monitoring at least one signal of a pitch actuator of a pitch system of the rotor blade of the wind turbine. The signal(s) is a proxy for a pitch driving torque of the pitch actuator of the pitch system. Thus, the method includes defining a metric that captures certain behavior of the proxy for the pitch driving torque of the pitch actuator of the pitch system. Further, the method includes comparing the metric to a corresponding metric associated with a reference rotor blade representing a healthy rotor blade. Moreover, the method includes implementing a control action when the metric is outside of a predetermined range defined by the healthy rotor blade.

In another aspect, the present disclosure is directed to a wind turbine having a tower, a nacelle mounted atop the tower, a rotor with a rotatable hub and at least one rotor blade communicatively coupled with a pitch system, and a controller configured to perform a plurality of operations for controlling the wind turbine. The plurality of operations includes, for example, monitoring at least one signal of a pitch actuator of a pitch system of the rotor blade of the wind turbine, the at least one signal being a proxy for a pitch driving torque of the pitch actuator of the pitch system, defining a metric that captures certain behavior of the proxy for the pitch driving torque of the pitch actuator of the pitch system, comparing the metric to a corresponding metric associated with a reference rotor blade representing a healthy rotor blade, and implementing a control action when the metric is outside of a predetermined range defined by the healthy rotor blade.

In still another aspect, the present disclosure is directed to a method for detecting and responding to damage in a rotor blade of a wind turbine. The method includes monitoring at least one signal of each pitch actuator in a pitch system of a plurality of rotor blades of the wind turbine. The signal(s) of each pitch actuator is a proxy for a pitch driving torque of each pitch actuator of the pitch system. The plurality of rotor blades includes the rotor blade. Thus, the method includes defining a metric associated with the proxy for the pitch driving torque of each pitch actuator of the pitch system. Further, the method includes comparing the metrics associated with the proxy for the pitch driving torque of each pitch actuator of the pitch system to each other. Moreover, the method includes implementing a control action when one of the metrics differs from other of the metrics by a certain amount.

These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 5 illustrates a schematic diagram of one embodiment of a controller according to the present disclosure;

FIG. 6 illustrates a flow diagram of an embodiment of a method for detecting and responding to rotor blade damage in a wind turbine according to the present disclosure;

FIG. 9 illustrates a flow diagram of another embodiment of a method for detecting and responding to rotor blade damage in a wind turbine according to the present disclosure.

DETAILED DESCRIPTION

Figure 1:
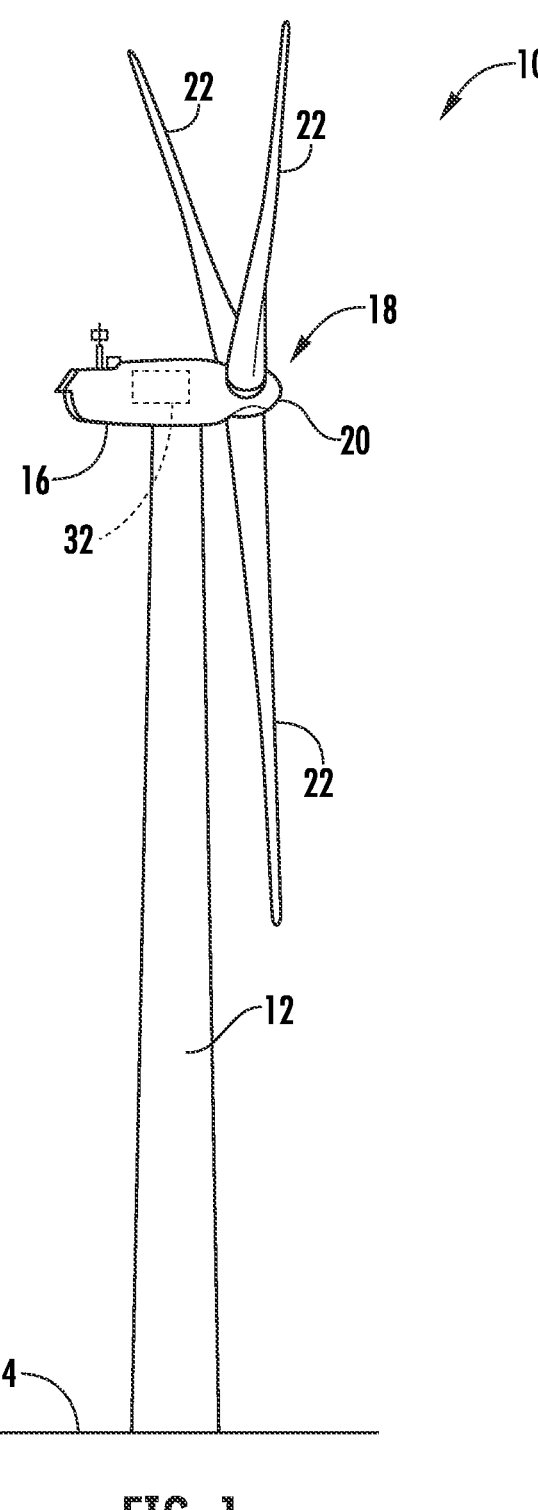
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present disclosure is directed to systems and methods for detecting and responding to rotor blade damage in a wind turbine. More specifically, the present disclosure provides a method to detect large scale structural damage of a rotor blade of a wind turbine by monitoring the torque required to pitch each rotor blade. For example, the torque required to pitch a rotor blade with structural damage can be different from that of a healthy rotor blade for multiple reasons. For example, loss of torsional rigidity can effectively change the pitch angle and thereby the aerodynamic pitch moment. Additionally, if the rotor blade deflects due to compromised structural health, the center of gravity of the rotor blade shifts, thereby imposing an additional pitching moment.

Accordingly, systems and methods of the present disclosure are configured to monitor one or more signals about the state of the pitch actuator that can serve as proxy for pitch driving torque. Examples of proxies for pitch driving torque may include pitch motor current, pitch motor voltage, pitch motor torque reference, hydraulic pitch system torque reference, hydraulic pitch system actuation pressure, etc. Further, systems and methods of the present disclosure are configured to define a metric that captures certain behavior (e.g., absolute value, rate of change, etc.) of the torque proxy for a rotor blade of interest. Thus, in an embodiment, the behavior metric may contain information from only to the rotor blade of interest or may contain information about how the rotor blade of interest relates to other rotor blades of the same wind turbine. Accordingly, systems and methods of the present disclosure can compare the metric of the rotor blade of interest to that of a nominally healthy rotor blade. In an embodiment, for example, systems and methods of the present disclosure may assume that at least one rotor blade on the wind turbine of interest is healthy and identify such rotor blade by determining a median value of the metric across the three rotor blades for that wind turbine. In another embodiment, for the healthy rotor blade reference, systems and methods of the present disclosure may generate a physics-based model for the expected pitch driving torque at a given operating condition. If a rotor blade is deemed to be unhealthy, the wind turbine can be shutdown, either automatically or by requesting site personnel to take action.

Referring now to the drawings, FIG. 1 illustrates a side view of one embodiment of a wind turbine 10. As shown, the wind turbine 10 generally includes a tower 12 extending from a support surface 14 (e.g., the ground, a concrete pad or any other suitable support surface). As such, it should be understood that the wind turbine 10 described herein may be an onshore or offshore wind turbine. In addition, the wind turbine 10 may also include a nacelle 16 mounted on the tower 12 and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 25 (FIG. 2) positioned within the nacelle 16 to permit electrical energy to be produced.

Figure 2:
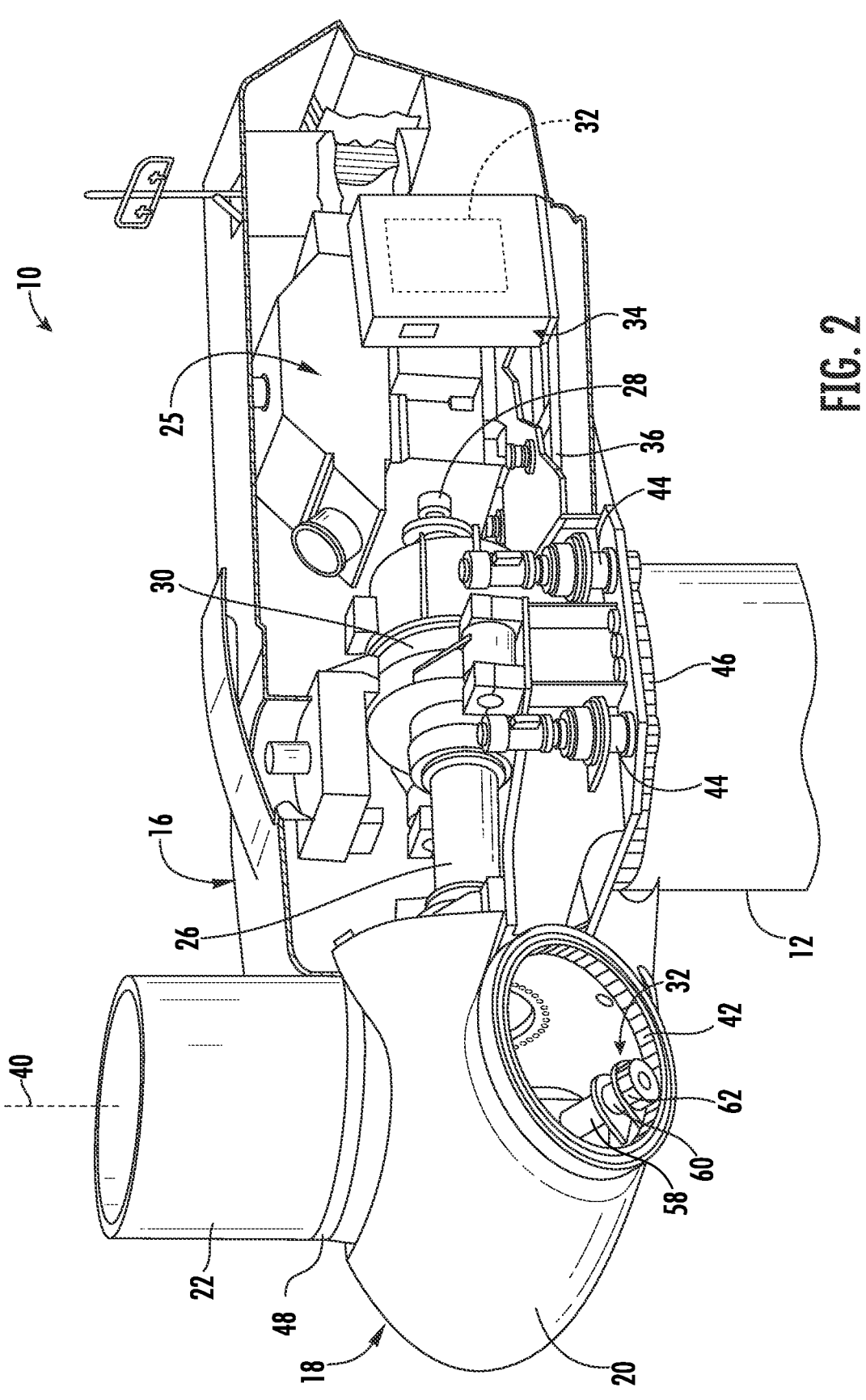
FIG. 2 illustrates a perspective, internal view of one embodiment of a nacelle of the wind turbine shown in FIG. 1.

Referring now to FIG. 2, a simplified, internal view of one embodiment of the nacelle 16 of the wind turbine 10 shown in FIG. 1 is illustrated. As shown, the generator 25 may be disposed within the nacelle 16 and supported atop a bedplate 36. In general, the generator 25 may be coupled to the rotor 18 for producing electrical power from the rotational energy generated by the rotor 18. For example, as shown in the illustrated embodiment, the rotor 18 may include a rotor shaft 26 coupled to the hub 20 for rotation therewith. The rotor shaft 26 may, in turn, be rotatably coupled to a generator shaft 28 of the generator 25 through a gearbox 30. As is generally understood, the rotor shaft 26 may provide a low speed, high torque input to the gearbox 30 in response to rotation of the rotor blades 22 and the hub 20. The gearbox 30 may then be configured to convert the low speed, high torque input to a high speed, low torque output to drive the generator shaft 28 and, thus, the generator 25.

The wind turbine 10 may also include a turbine controller 32 centralized within the nacelle 16. Further, as shown, the turbine controller 32 is housed within a control cabinet 34. Moreover, the turbine controller 32 may be communicatively coupled to any number of the components of the wind turbine 10 in order to control the operation of such components and/or implement various correction actions as described herein.

Figure 4:
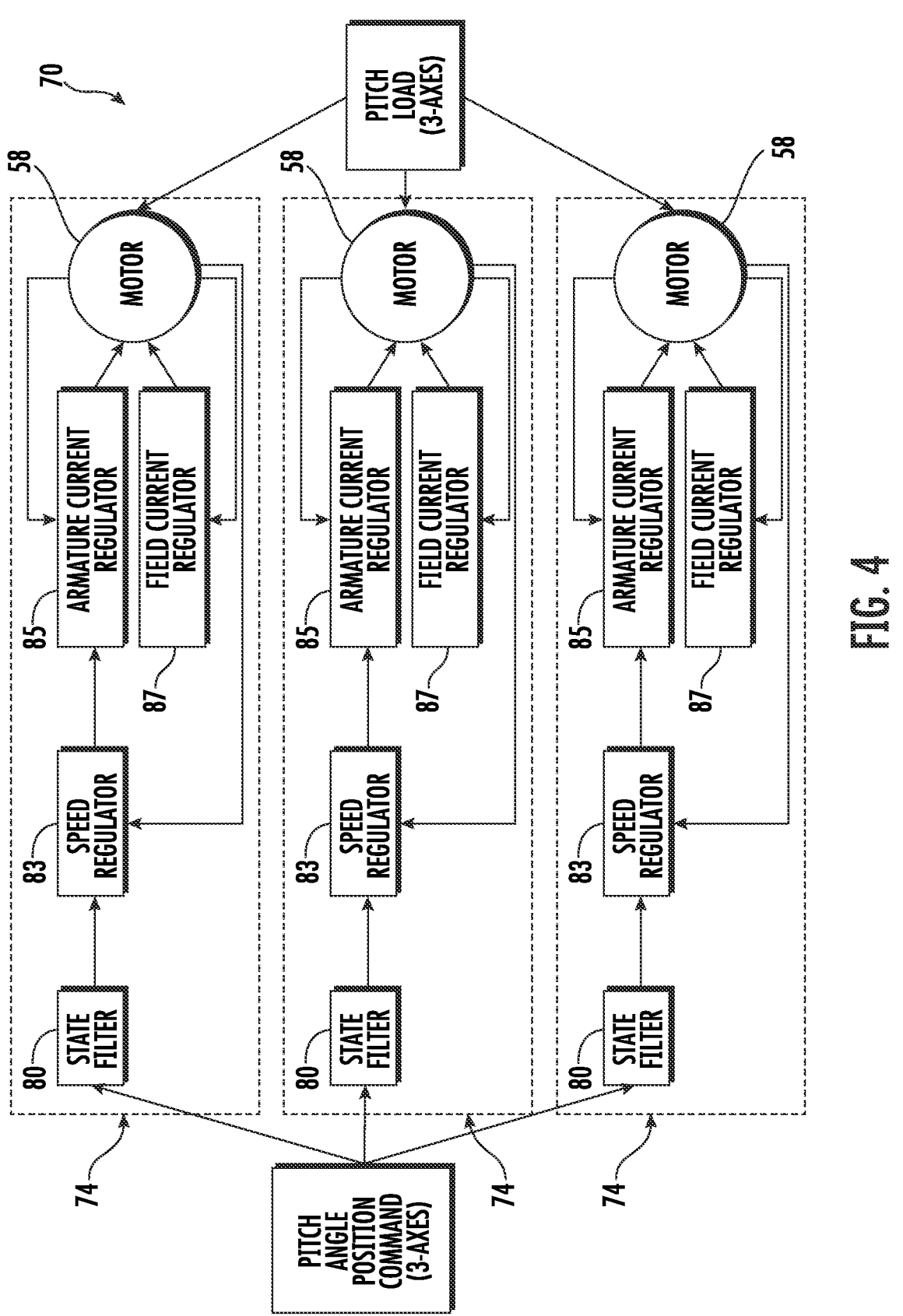
FIG. 4 illustrates a block diagram of one embodiment of a three-axis pitch system according to the present disclosure.

Referring to FIGS. 2 and 4, a schematic diagram of an embodiment of a pitch system 70 according to the present disclosure is illustrated. In particular, as shown, the pitch system 70 has three axis units driven by a pitch drive mechanism 38 configured to rotate each rotor blade 22 about its respective pitch axis 40 via a pitch bearing 42, thereby allowing the orientation of each rotor blade 22 to be adjusted relative to the direction of the wind. Each pitch drive mechanism 38 includes a pitch actuator, such as a pitch motor 58, that is regulated by a pitch controller 74 so that the rotor blades 22 can pitch individually under normal operation. It should be understood that the pitch motor 58 may be a direct current (DC) motor or an alternative current (AC) motor. Thus, when wind-generated power is beyond a threshold, individual pitch control is applied to reduce the tension on the rotor blades 22 and the tower 12 during operation. Similarly, the wind turbine 10 may include one or more yaw drive mechanisms 44 (FIG. 2) communicatively coupled to the turbine controller 32, with each yaw drive mechanism(s) 44 being configured to change the angle of the nacelle 16 relative to the wind (e.g., by engaging a yaw bearing 46 of the wind turbine 10).

Referring particularly to FIG. 4, each of the pitch controllers 74 of the pitch system 70 may include a state filter 80, a speed regulator 83, an armature current regulator 85, and a field current regulator 87. Accordingly, the pitch controllers 74 receive various pitch angle position commands and pitch the rotor blades 22 as needed based on the pitch load.

Figure 3:
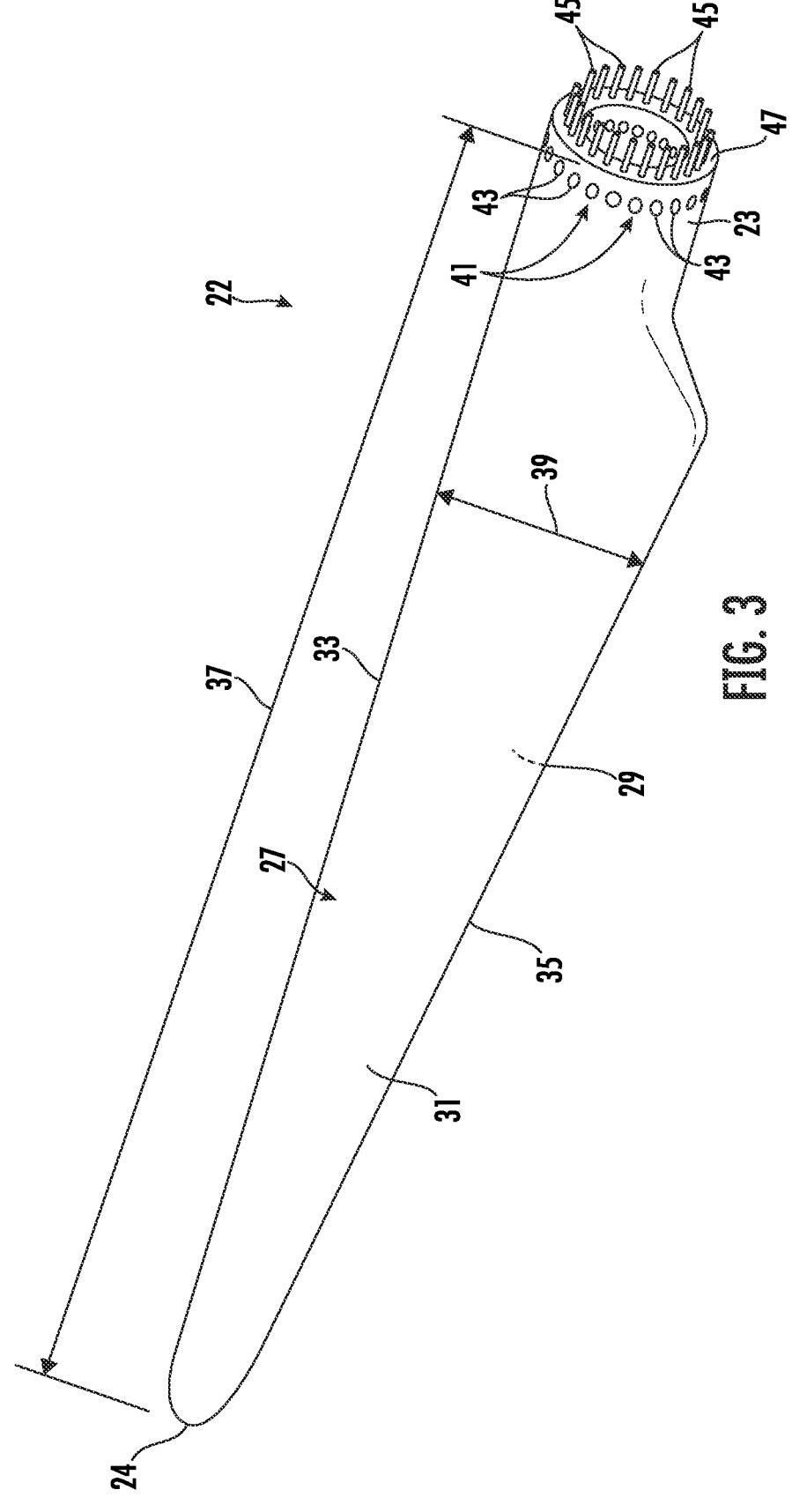
FIG. 3 illustrates a perspective view of one embodiment of one of the rotor blades of the wind turbine shown in FIG. 1.

Referring now to FIG. 3, a perspective view of one of the rotor blades 22 shown in FIGS. 1 and 2 is illustrated in accordance with aspects of the present disclosure. As shown, the rotor blade 22 includes a blade root 23 configured for mounting the rotor blade 22 to the hub 20 and a blade tip 24 disposed opposite the blade root 23. A body 27 of the rotor blade 22 may extend lengthwise between the blade root 23 and the blade tip 24 and may generally serve as the outer shell of the rotor blade 22. As is generally understood, the body 27 may define an aerodynamic profile (e.g., by defining an airfoil shaped cross-section, such as a symmetrical or cambered airfoil-shaped cross-section) to enable the rotor blade 22 to capture kinetic energy from the wind using known aerodynamic principles. Thus, the body 27 may generally include a pressure side 29 and a suction side 31 extending between a leading edge 33 and a trailing edge 35. Additionally, the rotor blade 22 may have a span 37 defining the total length of the body 27 between the blade root 23 and the blade tip 24 and a chord 39 defining the total length of the body 27 between the leading edge 33 and the trailing edge 35. As is generally understood, the chord 39 may vary in length with respect to the span 37 as the body 27 extends from the blade root 23 to the blade tip 24.

Moreover, as shown, the rotor blade 22 may also include a plurality of T-bolts or root attachment assemblies 41 for coupling the blade root 23 to the hub 20 of the wind turbine 10. In general, each root attachment assembly 41 may include a barrel nut 43 mounted within a portion of the blade root 23 and a root bolt 45 coupled to and extending from the barrel nut 43 so as to project outwardly from a root end 47 of the blade root 23. By projecting outwardly from the root end 47, the root bolts 45 may generally be used to couple the blade root 23 to the hub 20 (e.g., via one of the pitch bearings 42).

As shown in FIG. 5, the controller 32 may include one or more processor(s) 82 and associated memory device(s) 84 configured to perform a variety of computer-implemented functions (e.g., performing the methods, steps, calculations and the like and storing relevant data as disclosed herein). Additionally, the controller 32 may also include a communications module 86 to facilitate communications between the controller 32 and various sensor(s) 76, 78. Further, the communications module 86 may include a sensor interface 88 (e.g., one or more analog-to-digital converters) to permit signals transmitted from the sensor(s) 76, 78 to be converted into signals that can be understood and processed by the processors 82. It should be appreciated that the sensor(s) 76, 78 may be communicatively coupled to the communications module 86 using any suitable means. For example, as shown in FIG. 5, the sensor(s) 76, 78 may be coupled to the sensor interface 88 via a wired connection. However, in other embodiments, the sensor(s) 76, 78 may be coupled to the sensor interface 88 via a wireless connection, such as by using any suitable wireless communications protocol known in the art. As such, the processor(s) 82 may be configured to receive one or more signals from the sensor(s) 76, 78. Further, the controller 32 and the sensor(s) 76, 78 may also be an integrated packaged product.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor(s) 82 may also be configured to compute advanced control algorithms and communicate to a variety of Ethernet or serial-based protocols (Modbus, OPC, CAN, etc.) as well as classical analog or digital signals. Additionally, the memory device(s) 84 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 84 may generally be configured to store suitable computer-readable instructions that, when implemented by the processor(s) 82, configure the controller 32 to perform the various functions as described herein.

In additional embodiments, the sensor(s) 76, 78 described herein may include any one of or combination of the following sensors: electrical sensors, meteorological sensors (such as sensors capable of measuring temperature, humidity, air pressure, wind speed and direction, precipitation, and precipitation type), a proximity sensor, an inductive sensor, a Miniature Inertial Measurement Unit (MIMU), a pressure or load sensor, an accelerometer, a Sonic Detection and Ranging (SODAR) sensor, a Light Detection and Ranging (LIDAR) sensor, an optical sensor, or similar.

Referring now to FIG. 6, a flow diagram of an embodiment of a method 200 for detecting and responding to damage, such as one or more cracks, in a rotor blade of a wind turbine is illustrated. In some embodiments, the controller 32 is configured to perform such operations. In general, the method 200 will be described herein with reference to the wind turbine 10 and the controller 32 illustrated in FIGS. 1-5. However, it should be appreciated that the disclosed method 200 may be implemented with wind turbines having any other suitable configurations. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (202), the method 200 may include monitoring at least one signal of a pitch actuator of a pitch system of the rotor blade of the wind turbine. Moreover, in an embodiment, such monitoring may be performed online, e.g., in real-time. In particular, in an embodiment, the signal(s) is a proxy for a pitch driving torque of the pitch actuator of the pitch system. For example, in an embodiment, wherein the signal(s) of the pitch actuator of the pitch system may include pitch actuator current (such as an armature current for a DC motor or a torque-related current component for an AC motor), pitch actuator voltage, a pitch actuator torque reference, a hydraulic pitch system torque reference, a hydraulic pitch system actuation pressure, or similar, as well as combinations thereof.

As shown at (204), the method 200 may include defining a metric that captures certain behavior of the proxy for the pitch driving torque of the pitch actuator of the pitch system. In an embodiment, for example, the metric may include information relating only to the rotor blade. In other embodiments, the metric may include information relating to the rotor blade as well as information relating to how the rotor blade compares to all other rotor blades of the wind turbine. Moreover, in an embodiment, the certain behavior of the proxy for the pitch driving torque of the pitch actuator of the pitch system may include an absolute value, an average, a root mean square, a standard deviation, a distance, a change, a rate of change, an acceleration, or combinations thereof.

As shown at (206), the method 200 may include comparing the metric to a corresponding metric associated with a reference rotor blade representing a healthy rotor blade. For example, in an embodiment, the method 200 may include determining the reference rotor blade representing the healthy rotor blade by determining a median value of the metric across all rotor blades of the wind turbine and identifying one of the rotor blades of the wind turbine as the healthy rotor blade based on the median value. In other embodiments, the method 200 may include determining the reference rotor blade representing the healthy rotor blade by generating a physics-based model for an expected pitch driving torque at a given operating condition for the healthy rotor blade and identifying one of the rotor blades of the wind turbine as the healthy rotor blade using the physics-based model.

In particular embodiments, for example, the pitch motor(s) 58 is typically the only sensor (i.e., point of data collection/information) in the blade load path. Furthermore, pitch motor current has a linear relationship with blade pitching torque. Thus, pitch motor current, particularly changes in the pitch motor current, can be used as an indicator of blade health. For example, a critical crack size allows the rotor blade 22 to deflect, which changes the aerodynamic loading of the blade. In such instances, there will be a mean shift observed under thrust loading and a standard deviation shift related to shear loading and/or gravity.

Accordingly, and referring still to FIG. 6, as shown at (208), the method 200 may include implementing a control action when the metric is outside of a predetermined range defined by the healthy rotor blade. For example, in an embodiment, the control action may include generating an alarm, scheduling a maintenance action, pitching the rotor blade, shutting down the wind turbine, derating the wind turbine, uprating the wind turbine, replacing the rotor blade, or any other suitable control action or combinations thereof.

Figure 7A:
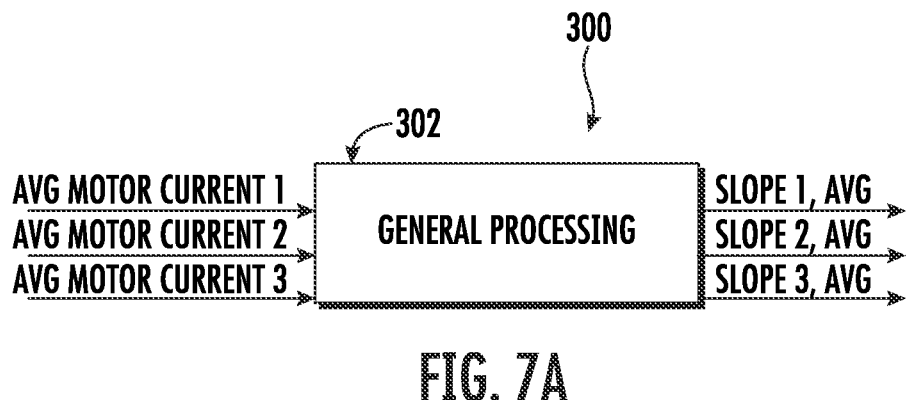
FIGS. 7A-7D illustrate flow diagrams of an algorithm for detecting and responding to damage, such as one or more cracks, in a rotor blade of a wind turbine according to the present disclosure.
Figure 7B:
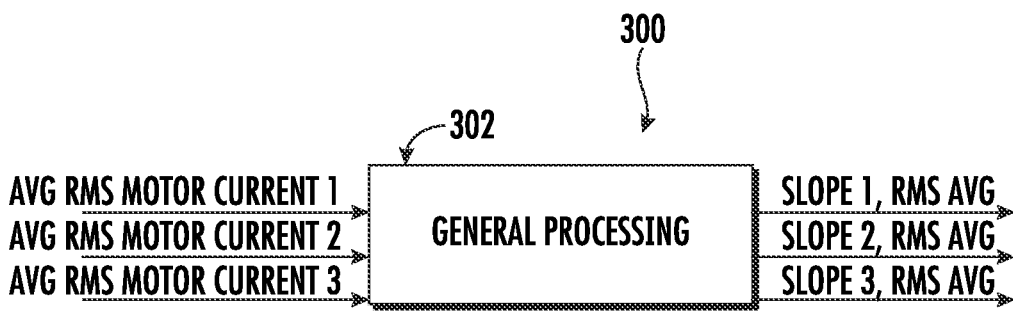
Figures 7C, 7D:
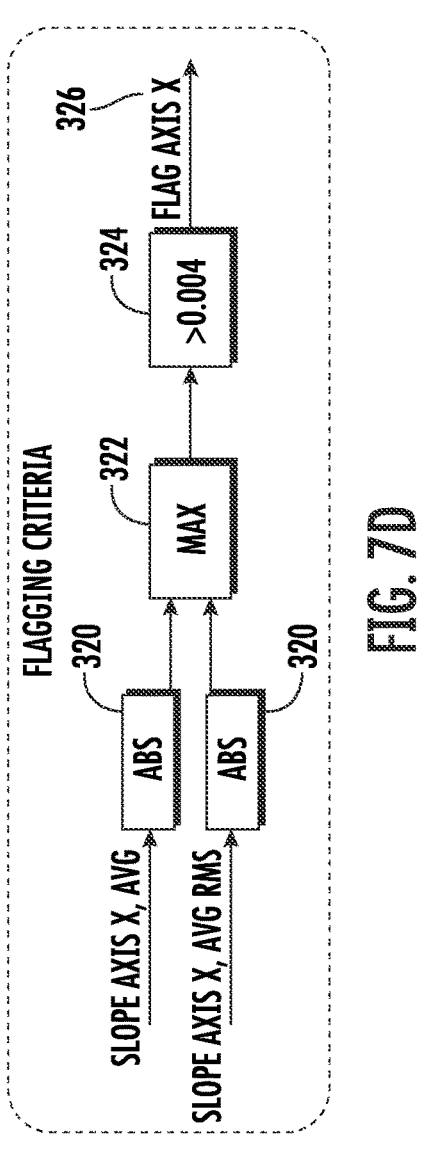

Since the torque required to pitch a rotor blade with structural damage can be different from that of a healthy rotor blade, the method 200 of the present disclosure is configured to detect and respond to structural damage of the rotor blade 22. Thus, the method 200 of FIG. 6 can be better understood with respect to FIGS. 7A-7D. In particular, FIGS. 7A-7D illustrate flow diagrams of an algorithm 300 for detecting and responding to damage, such as one or more cracks, in a rotor blade of a wind turbine. As shown in FIGS. 7A-7C, the algorithm 300 includes receiving signals (e.g., axis 1 signal, axis 2 signal, and axis 3 signal) from the pitch motors 58 of the pitch system 70. As mentioned, the signals are a proxy for a pitch driving torque of the pitch motors 58 of the pitch system 70. Thus, as shown particularly in FIG. 7A, the signals may be the average motor current from the pitch motors 58 of the pitch system 70. In other embodiments, as shown in FIG. 7B, the signals may be the average root-mean-square (RMS) current from the pitch motors 58 of the pitch system 70.

Irrespective of the types of signals received, the algorithm 300 includes general processing of such signals, as illustrated in FIGS. 7A-7C. In particular, as shown at 304 in FIG. 7C, the signals may be processed to remove implausible or unusable data and/or any low thrust time-series windows. For example, in an embodiment, the signals may be filtered to include only data points where the blades are under significant thrust loading. Moreover, the signals may be filtered to remove poor quality data. Moreover, in an embodiment, certain filtering steps can be applied to the signals to prevent false positives. In particular embodiments, for example, when the rotor blades 22 are commanded to a fixed pitch angle for a certain duration, pitch brakes can be engaged to eliminate the pitch actuator demand, i.e., the actuator demand no longer serves as a good proxy for pitching torque. Thus, such data points can be filtered out in the algorithm 300. Such filtering may be accomplished using a variety of methods depending on available data. In an embodiment, for example, the algorithm 300 may directly eliminate time periods when pitch brakes are engaged and/or time periods in wind speed ranges where it is expected that pitch brakes will likely engage.

As shown at 308, an output 306 of such processing can then be normalized by centering the data around a median signal, such as a median pitch axis. In an embodiment, for example, the motor current average statistic can be computed for each 10-minute data point $(t_i)$ using, e.g., Equation (1) below:

$$med(t_i)=median[sig1(t_i),sig2(t_i),sig3(t_i)] \qquad \text{Equation (1)}$$

Thus, as shown at 312, an output 310 of 308 may then be further processed to calculate a slope 314 of each processed signal with respect to time (i.e., a rate of change of the three axes with respect to time over a rolling window). As shown at 316, the slopes 314 may be centered around a median pitch axis to arrive at slopes 318.

Figure 8:
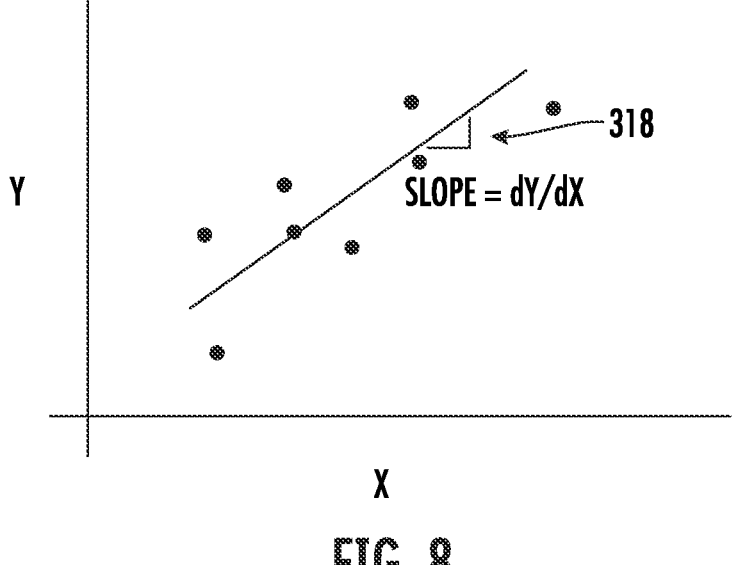
FIG. 8 illustrates a graph of a slope where y-values are the median values centered around pitch motor current signals and x-values are the number of sample windows according to the present disclosure.

In particular embodiments, as shown in FIG. 8, calculating the slopes 318 may include calculating a linear regression slope with respect to sample numbers on a rolling sample window, where the y-values are the median values centered around pitch actuator current signals and the x-values are the number of sample windows. In an embodiment, for example, the x-values may be an evenly spaced, monotonically increasing vector selected to remove an effect of missing/filtered data on the regression outcome.

Accordingly, as shown in FIG. 7D, the slopes 318 determined in FIG. 7C can be used to flag rotor blades with potential damage. In particular, as shown, an average slope and/or an average RMS slope of axis x of the wind turbine 10 may be received and processed. More specifically, as shown at 320, the absolute value of each of the average slope and/or the average RMS slope of axis x may be determined. Thus, as shown at 322, a maximum value between the average slope and the average RMS slope of axis x can be determined and compared to a threshold 324. If the maximum value is greater than the threshold 324, as shown at 326, then the corresponding rotor blade can be flagged as damaged or unhealthy.

Referring now to FIG. 9, a flow diagram of an embodiment of a method 400 for detecting and responding to damage, such as one or more cracks, in a rotor blade of a wind turbine is illustrated. In some embodiments, the controller 32 is configured to perform such operations. In general, the method 400 will be described herein with reference to the wind turbine 10 and the controller 32 illustrated in FIGS. 1-5. However, it should be appreciated that the disclosed method 200 may be implemented with wind turbines having any other suitable configurations. In addition, although FIG. 9 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (402), the method 400 may include monitoring at least one signal of each pitch actuator in a pitch system of a plurality of rotor blades of the wind turbine. As mentioned, the signal(s) of each pitch actuator is a proxy for a pitch driving torque of each pitch actuator of the pitch system. As shown at (404), the method 400 may include defining a metric associated with the proxy for the pitch driving torque of each pitch actuator of the pitch system. As shown at (406), the method 400 may include comparing the metrics associated with the proxy for the pitch driving torque of each pitch actuator of the pitch system to each other. As shown at (408), the method 400 may include implementing a control action when one of the metrics differs from other of the metrics by a certain amount.

Further aspects of the invention are provided by the disclosure of the following clauses:

A method for detecting and responding to damage in a rotor blade of a wind turbine, the method comprising: monitoring at least one signal of a pitch actuator of a pitch system of the rotor blade of the wind turbine, the at least one signal being a proxy for a pitch driving torque of the pitch actuator of the pitch system; defining a metric that captures certain behavior of the proxy for the pitch driving torque of the pitch actuator of the pitch system; comparing the metric to a corresponding metric associated with a reference rotor blade representing a healthy rotor blade; and implementing a control action when the metric is outside of a predetermined range defined by the healthy rotor blade.

The method of any preceding clause, wherein the at least one signal of the pitch actuator of the pitch system comprises at least one of a pitch motor current, a pitch motor voltage, a pitch motor torque reference, a hydraulic pitch system torque reference, or a hydraulic pitch system actuation pressure.

The method of any preceding clause, wherein the pitch motor current comprises one or more of an armature current for a DC motor or a torque-related current component for an AC motor of the pitch system.

The method of any preceding clause, further comprising filtering the signals to eliminate at least one of time periods when one or more pitch brakes of the pitch system are engaged and time periods having wind speed ranges where the one or more pitch brakes are likely to engage.

The method of any preceding clause, wherein the metric comprises information relating only to the rotor blade.

The method of any preceding clause, wherein the metric comprises information relating to the rotor blade and information relating to how the rotor blade compares to all other rotor blades of the wind turbine.

The method of any preceding clause, wherein the certain behavior of the proxy for the pitch driving torque of the pitch actuator of the pitch system comprises at least one of an absolute value, an average, a root mean square, a standard deviation, a distance, a change, a rate of change, an acceleration, or combinations thereof.

The method of any preceding clause, further comprising determining the reference rotor blade representing the healthy rotor blade by: determining a median value of the metric across all rotor blades of the wind turbine and identifying one of the rotor blades of the wind turbine as the healthy rotor blade based on the median value.

The method of any preceding clause, further comprising determining the reference rotor blade representing the healthy rotor blade by: generating a physics-based model for an expected pitch driving torque at a given operating condition for the healthy rotor blade; and identifying one of the rotor blades of the wind turbine as the healthy rotor blade using the physics-based model.

The method of any preceding clause, further comprising monitoring the at least one signal of the pitch actuator of the pitch system online.

The method of any preceding clause, wherein the damage in the rotor blade is a crack in the rotor blade.

The method of any preceding clause, wherein the control action further comprises generating an alarm, scheduling a maintenance action, pitching the rotor blade, shutting down the wind turbine, derating the wind turbine, uprating the wind turbine, or replacing the rotor blade.

A wind turbine, comprising: a tower; a nacelle mounted atop the tower; a rotor comprising a rotatable hub and at least one rotor blade communicatively coupled with a pitch system; and a controller configured to perform a plurality of operations for controlling the wind turbine, the plurality of operations comprising: monitoring at least one signal of a pitch actuator of a pitch system of the rotor blade of the wind turbine, the at least one signal being a proxy for a pitch driving torque of the pitch actuator of the pitch system; defining a metric that captures certain behavior of the proxy for the pitch driving torque of the pitch actuator of the pitch system; comparing the metric to a corresponding metric associated with a reference rotor blade representing a healthy rotor blade; and implementing a control action when the metric is outside of a predetermined range defined by the healthy rotor blade.

The wind turbine of any preceding clause, wherein the at least one signal of the pitch actuator of the pitch system comprises at least one of a pitch motor current, a pitch motor voltage, a pitch motor torque reference, a hydraulic pitch system torque reference, or a hydraulic pitch system actuation pressure.

The wind turbine of any preceding clause, wherein the metric comprises information relating only to the rotor blade.

The wind turbine of any preceding clause, wherein the metric comprises information relating to the rotor blade and information relating to how the rotor blade compares to all other rotor blades of the wind turbine.

The wind turbine of any preceding clause, wherein the certain behavior of the proxy for the pitch driving torque of the pitch actuator of the pitch system comprises at least one of an absolute value, an average, a root mean square, a standard deviation, a distance, a change, a rate of change, an acceleration, or combinations thereof.

The wind turbine of any preceding clause, further comprising determining the reference rotor blade representing the healthy rotor blade by one of: determining a median value of the metric across all rotor blades of the wind turbine and identifying one of the rotor blades of the wind turbine as the healthy rotor blade based on the median value, and generating a physics-based model for an expected pitch driving torque at a given operating condition for the healthy rotor blade, and identifying one of the rotor blades of the wind turbine as the healthy rotor blade using the physics-based model.

The wind turbine of any preceding clause, wherein the control action further comprises generating an alarm, scheduling a maintenance action, pitching the rotor blade, shutting down the wind turbine, derating the wind turbine, uprating the wind turbine, or replacing the rotor blade.

A method for detecting and responding to damage in a rotor blade of a wind turbine, the method comprising: monitoring at least one signal of each pitch actuator in a pitch system of a plurality of rotor blades of the wind turbine, the at least one signal of each pitch actuator being a proxy for a pitch driving torque of each pitch actuator of the pitch system, the plurality of rotor blades comprising the rotor blade; defining a metric associated with the proxy for the pitch driving torque of each pitch actuator of the pitch system; comparing the metrics associated with the proxy for the pitch driving torque of each pitch actuator of the pitch system to each other; and implementing a control action when one of the metrics differs from other of the metrics by a certain amount.

This written description uses examples to disclose the invention, including the best mode, and also to enable any person skilled in the art to practice the invention, including making and using any devices or systems and performing any incorporated methods. The patentable scope o\f\ the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for detecting and responding to damage in a rotor blade of a wind turbine, the method comprising:
monitoring at least one signal of a pitch actuator of a pitch system of the rotor blade of the wind turbine, the at least one signal being a proxy for a pitch driving torque of the pitch actuator of the pitch system;
defining a time-domain metric that captures certain behavior of the proxy for the pitch driving torque of the pitch actuator of the pitch system during a certain time period, wherein the certain behavior of the proxy for the pitch driving torque of the pitch actuator of the pitch system comprises at least a rate of change of the proxy for the pitch drive torque;
comparing the time-domain metric to a corresponding time-domain metric associated with a reference rotor blade representing a healthy rotor blade, the corresponding time-domain metric also being collected during the certain time period; and
implementing a control action when the time-domain metric is outside of a predetermined range for the corresponding time-domain metric defined by the healthy rotor blade.

2. The method of claim 1, wherein the at least one signal of the pitch actuator of the pitch system comprises at least one of a pitch motor current, a pitch motor voltage, a pitch motor torque reference, a hydraulic pitch system torque reference, or a hydraulic pitch system actuation pressure.

3. The method of claim 2, wherein the pitch motor current comprises one or more of an armature current for a DC motor or a torque-related current component for an AC motor of the pitch system.

4. The method of claim 1, further comprising filtering the signals to eliminate at least one of time periods when one or more pitch brakes of the pitch system are engaged and time periods having wind speed ranges where the one or more pitch brakes are likely to engage.

5. The method of claim 1, wherein the time-domain metric comprises information relating only to the rotor blade.

6. The method of claim 1, wherein the time-domain metric comprises information relating to the rotor blade and information relating to how the rotor blade compares to all other rotor blades of the wind turbine.

7. The method of claim 1, wherein the certain behavior of the proxy for the pitch driving torque of the pitch actuator of the pitch system further comprises at least one of an absolute value, an average, a root mean square, a standard deviation, a distance, a change, an acceleration, or combinations thereof.

8. The method of claim 1, further comprising determining the reference rotor blade representing the healthy rotor blade by:
determining a median value of the time-domain metric across all rotor blades of the wind turbine and identifying one of the rotor blades of the wind turbine as the healthy rotor blade based on the median value.

9. The method of claim 1, further comprising determining the reference rotor blade representing the healthy rotor blade by:
generating a physics-based model for an expected pitch driving torque at a given operating condition for the healthy rotor blade; and
identifying one of the rotor blades of the wind turbine as the healthy rotor blade using the physics-based model.

10. The method of claim 1, further comprising monitoring the at least one signal of the pitch actuator of the pitch system online.

11. The method of claim 1, wherein the damage in the rotor blade is a crack in the rotor blade.

12. The method of claim 1, wherein the control action further comprises generating an alarm, scheduling a maintenance action, pitching the rotor blade, shutting down the wind turbine, derating the wind turbine, uprating the wind turbine, or replacing the rotor blade.

13. A wind turbine, comprising:
a tower;
a nacelle mounted atop the tower;
a rotor comprising a rotatable hub and at least one rotor blade communicatively coupled with a pitch system; and
a controller configured to perform a plurality of operations for controlling the wind turbine, the plurality of operations comprising:
monitoring at least one signal of a pitch actuator of a pitch system of the rotor blade of the wind turbine during a certain time period, the at least one signal being a proxy for a pitch driving torque of the pitch actuator of the pitch system;
defining a time-domain metric that captures certain behavior of the proxy for the pitch driving torque of the pitch actuator of the pitch system, wherein the certain behavior of the proxy for the pitch driving torque of the pitch actuator of the pitch system comprises at least a rate of change of the proxy for the pitch drive torque;
comparing the time-domain metric to a corresponding time-domain metric associated with a reference rotor blade representing a healthy rotor blade, the corresponding time-domain metric also being collected during the certain time period; and
implementing a control action when the time-domain metric is outside of a predetermined range defined by the healthy rotor blade.

14. The wind turbine of claim 13, wherein the at least one signal of the pitch actuator of the pitch system comprises at least one of a pitch motor current, a pitch motor voltage, a pitch motor torque reference, a hydraulic pitch system torque reference, or a hydraulic pitch system actuation pressure.

15. The wind turbine of claim 13, wherein the time-domain metric comprises information relating only to the rotor blade.

16. The wind turbine of claim 13, wherein the time-domain metric comprises information relating to the rotor blade and information relating to how the rotor blade compares to all other rotor blades of the wind turbine.

17. The wind turbine of claim 13, wherein the certain behavior of the proxy for the pitch driving torque of the pitch actuator of the pitch system comprises at least one of an absolute value, an average, a root mean square, a standard deviation, a distance, a change, an acceleration, or combinations thereof.

18. The wind turbine of claim 13, further comprising determining the reference rotor blade representing the healthy rotor blade by one of:

determining a median value of the time-domain metric across all rotor blades of the wind turbine and identifying one of the rotor blades of the wind turbine as the healthy rotor blade based on the median value, and generating a physics-based model for an expected pitch driving torque at a given operating condition for the healthy rotor blade, and identifying one of the rotor blades of the wind turbine as the healthy rotor blade using the physics-based model.

19. The wind turbine of claim 13, wherein the control action further comprises generating an alarm, scheduling a maintenance action, pitching the rotor blade, shutting down the wind turbine, derating the wind turbine, uprating the wind turbine, or replacing the rotor blade.

* * * * *